United States Patent
Yamakawa et al.

(10) Patent No.: US 10,869,123 B2
(45) Date of Patent: Dec. 15, 2020

(54) ARRAY MICROPHONE AND SOUND COLLECTION METHOD

(71) Applicant: YAMAHA CORPORATION, Hamamatsu (JP)

(72) Inventors: Takashi Yamakawa, Iwata (JP); Yuji Ikegaya, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 16/658,464

(22) Filed: Oct. 21, 2019

(65) Prior Publication Data
US 2020/0137485 A1 Apr. 30, 2020

(30) Foreign Application Priority Data
Oct. 24, 2018 (JP) .................. 2018-200307

(51) Int. Cl.
H04R 1/40 (2006.01)
G10L 21/0208 (2013.01)
H04M 9/08 (2006.01)
H04R 3/00 (2006.01)
G10L 21/0216 (2013.01)

(52) U.S. Cl.
CPC .......... *H04R 1/406* (2013.01); *G10L 21/0208* (2013.01); *H04M 9/082* (2013.01); *H04R 3/005* (2013.01); *G10L 2021/02082* (2013.01); *G10L 2021/02166* (2013.01); *H04R 2201/401* (2013.01); *H04R 2430/23* (2013.01)

(58) Field of Classification Search
CPC ................ H04R 3/005; H04R 2430/21; H04R 2201/401; H04R 2201/405
USPC .............................. 381/92, 71.11, 94.7, 119
See application file for complete search history.

(56) References Cited

U.S. PATENT DOCUMENTS

| | | | |
|---|---|---|---|
| 9,264,553 B2 | 2/2016 | Pandey | |
| 9,532,138 B1* | 12/2016 | Allen | H04R 3/005 |
| 9,565,493 B2 | 2/2017 | Abraham | |
| 9,659,576 B1* | 5/2017 | Kotvis | G10L 21/0224 |
| 9,894,434 B2 | 2/2018 | Rollow, IV | |
| 2006/0147029 A1* | 7/2006 | Stokes, III | H04M 9/082 |
| | | | 379/388.07 |
| 2009/0052684 A1 | 2/2009 | Ishibashi | |
| 2009/0052688 A1 | 2/2009 | Ishibashi | |
| 2010/0150364 A1 | 6/2010 | Buck | |
| 2015/0078582 A1* | 3/2015 | Graham | G10L 21/0232 |
| | | | 381/92 |
| 2019/0139563 A1* | 5/2019 | Chen | G10L 25/30 |

OTHER PUBLICATIONS

Extended European Search Report issued in European Application No. 19204533.4 dated Feb. 25, 2020.

* cited by examiner

*Primary Examiner* — Alexander Krzystan
(74) *Attorney, Agent, or Firm* — Rossi, Kimms & McDowell LLP

(57) ABSTRACT

A sound collection method includes estimating at least one sound source direction and forming a plurality of sound collection beams in the estimated plurality of sound source direction, using sound collection signals of a plurality of microphones. The number of sound source directions estimated is smaller than the number of sound collection beams formed.

20 Claims, 10 Drawing Sheets

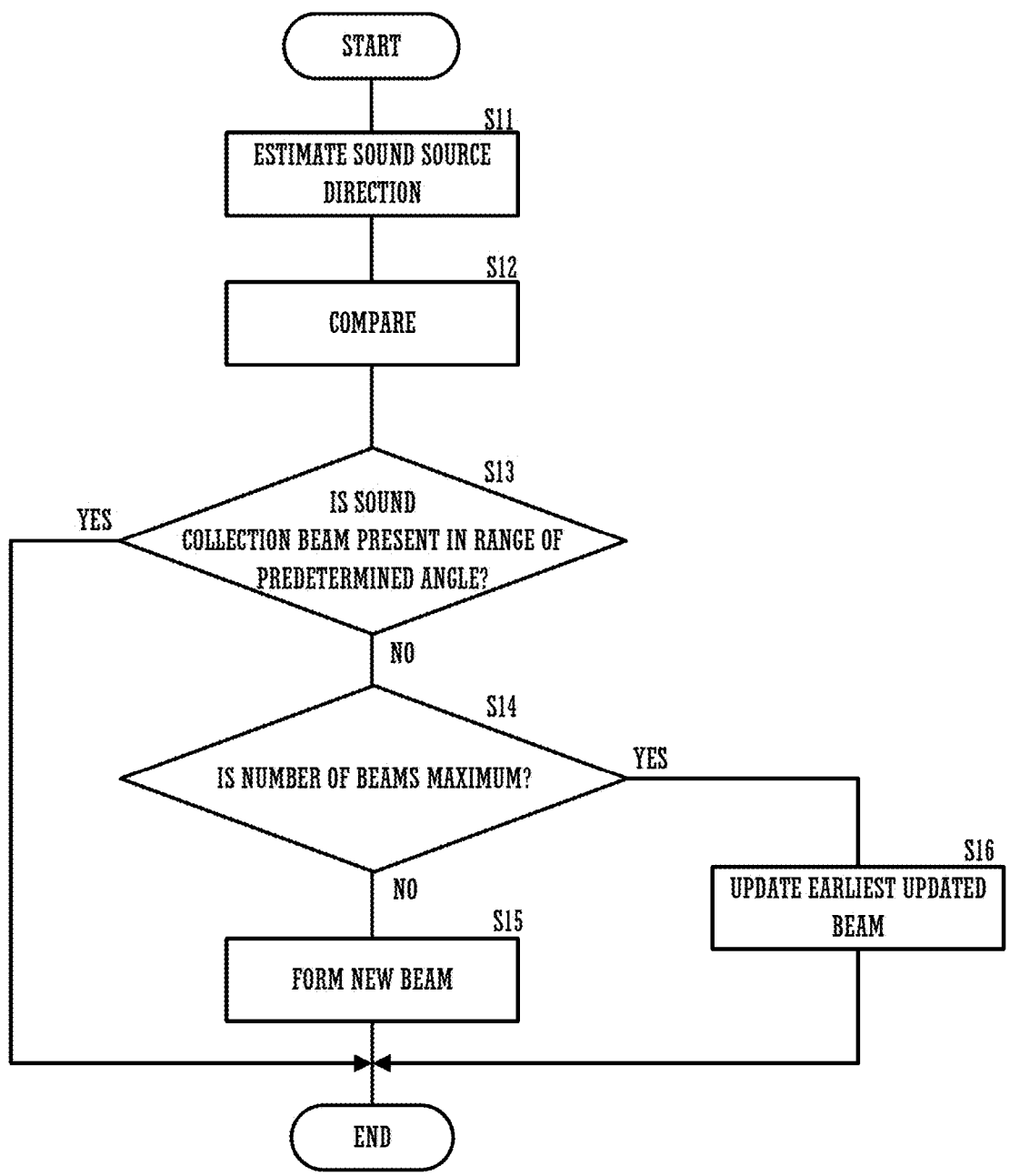

ARRAY MICROPHONE AND SOUND COLLECTION METHOD

CROSS REFERENCE TO RELATED APPLICATIONS

This Nonprovisional application claims priority under 35 U.S.C. § 119(a) on Patent Application No. 2018-200307 filed in Japan on Oct. 24, 2018 the entire contents of which are hereby incorporated by reference.

BACKGROUND OF THE INVENTION

1. Field of the Invention

A preferred embodiment according to the present invention relates to an array microphone including a plurality of microphones, and a sound collection method.

2. Description of the Related Art

The U.S. Pat. No. 9,894,434 discloses a tracking array microphone that forms one sound collection beam and causes the direction of the sound collection beam to track a direction of a sound source.

In addition, the U.S. Pat. No. 9,565,493 and the U.S. Pat. No. 9,264,553 disclose an array microphone that forms a plurality of sound collection beams.

In the tracking array microphone that forms one sound collection beam, as disclosed in the U.S. Pat. No. 9,894,434, a time lag occurs from when a talker is changed to when the direction of the sound collection beam is changed. Therefore, the beginning of an utterance of a new talker may be unable to be collected.

SUMMARY OF THE INVENTION

An object of a preferred embodiment of the present invention is to provide an array microphone and a sound collection method that are capable of supporting a plurality of sound source directions.

An array microphone according to a preferred embodiment of the present invention includes a plurality of microphones, an estimator that estimates at least one sound source direction, and a beam former that forms a plurality of sound collection beams in the estimated at least one sound source directions, using sound collection signals of the plurality of microphones. The number of the at least one sound source direction estimated by the estimator is smaller than the number of sound collection beams formed by the beam former.

The above and other elements, features, characteristics, and advantages of the present invention will become more apparent from the following detailed description of the preferred embodiments with reference to the attached drawings.

BRIEF DESCRIPTION OF THE DRAWINGS

FIG. 4 is a flow chart showing an operation of the array microphone 1.

DETAILED DESCRIPTION OF THE PREFERRED EMBODIMENTS

An array microphone according to the present preferred embodiment includes a plurality of microphones, an estimator that estimates at least one sound source direction, and a beam former that forms a plurality of sound collection beams in the estimated at least one sound source directions, using sound collection signals of the plurality of microphones. The number of the at least one sound source direction estimated by the estimator is smaller than the number of sound collection beams formed by the beam former.

In this manner, the array microphone causes the number of sound collection beams to be greater than the estimation number of sound source directions, and directs the sound collection beams in a direction in addition to the currently estimated sound source direction. Accordingly, the array microphone, even when a talker is changed, is able to collect an utterance of a new talker by the sound collection beam that has been already directed in another direction. Therefore, the array microphone is able to support a plurality of sound source directions, and is also able to collect the beginning of an utterance of a new talker. In addition, an increase in the amount of calculation is able to be reduced more by reducing the estimation number of sound source directions than by estimating a plurality of sound source directions and forming a plurality of sound collection beams in each direction.

In addition, the array microphone may include a plurality of microphones, an estimator that estimates a direction of at least two sound sources, and a beam former that forms at least two sound collection beams in the direction of at least two sound sources that has been estimated by the estimator, using sound collection signals of the plurality of microphones. In such a case, the estimator may estimate a two-dimensional direction (the plane direction and the elevation direction). In this case, the array microphone is able to form a sound collection beam that tracks at least two sound sources, and is able to automatically and clearly collect sound of the at least two sound sources. Therefore, the array microphone is able to support a plurality of sound source directions. As a matter of course, the array microphone is also able to support 0 or 1 sound source direction.

In addition, the array microphone may include a mixing processor that mixes an audio signal according to a sound collection beam, among the plurality of sound collection beams, by a gain according to volume of the sound collection beam.

In such a case, since the gain of the sound collection beam directed to a direction other than the currently estimated sound source direction is reduced, the voice of a current talker is able to be clearly collected.

Figure 1:
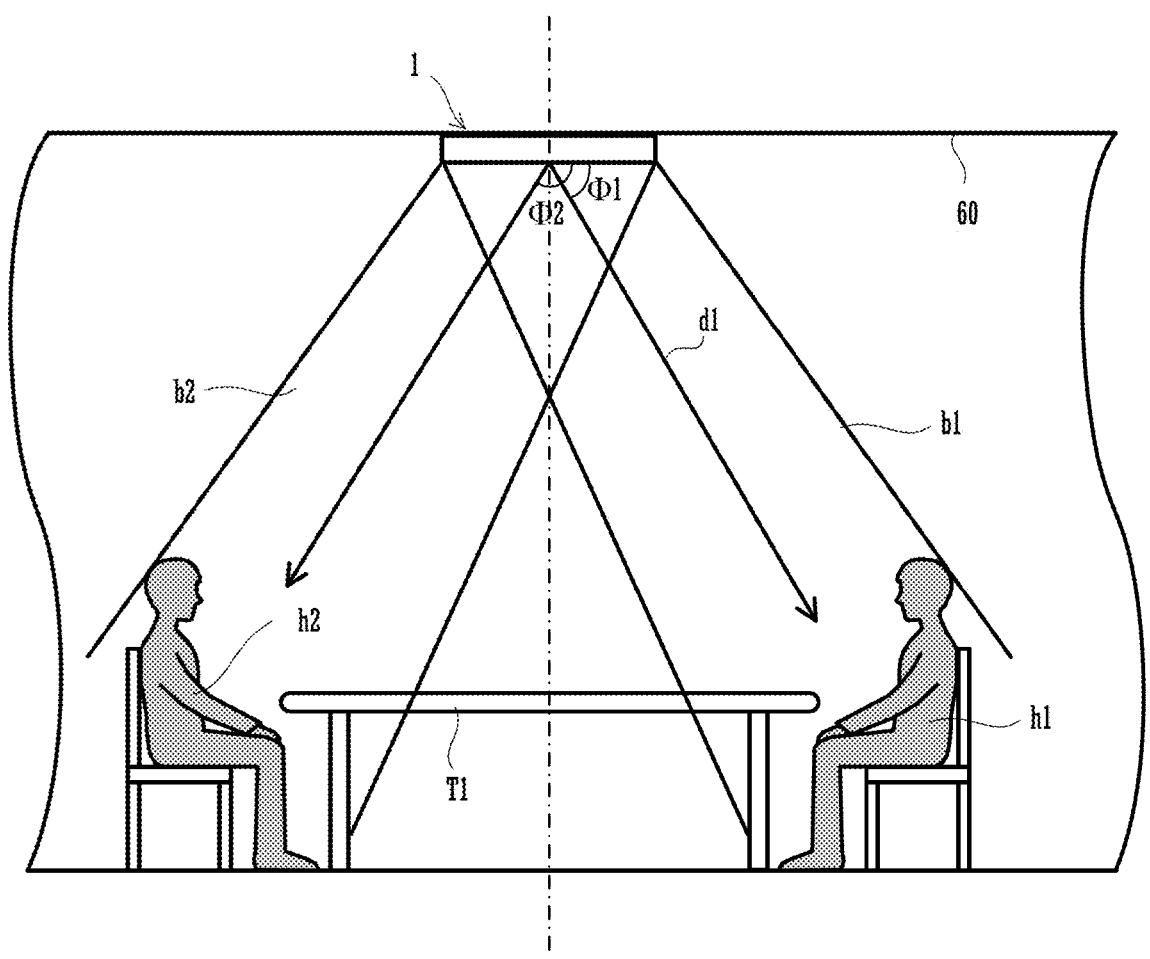
FIG. 1 is an elevational view of the interior of a room in which an array microphone 1 is installed.
Figure 2:
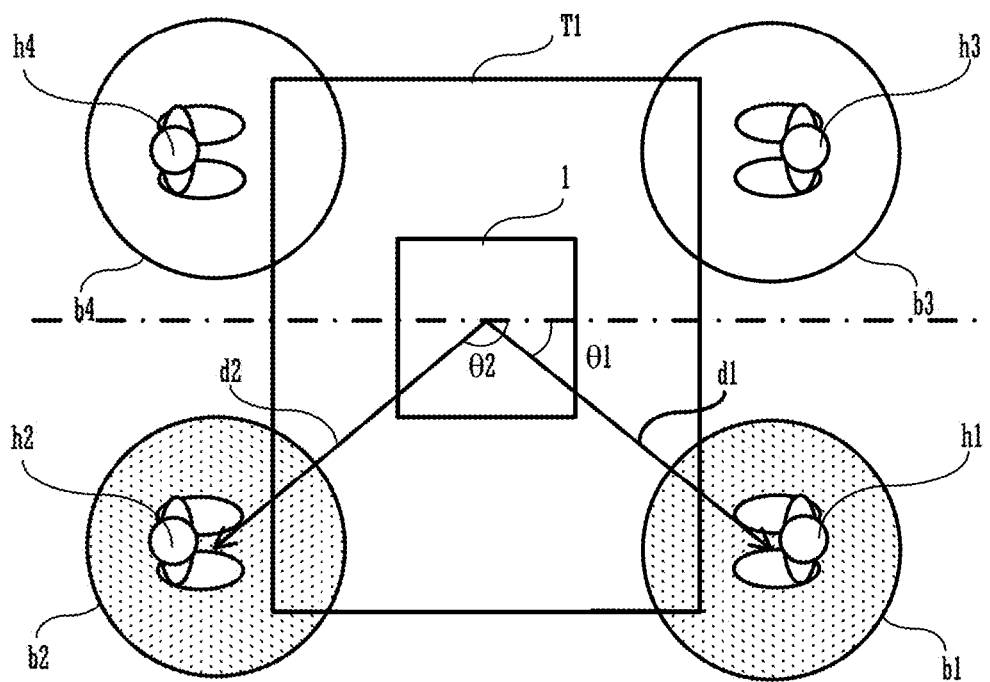
FIG. 2 is a plan view of the interior of the room in which the array microphone 1 is installed.

Hereinafter, a specific configuration according to the present preferred embodiment will be described. FIG. 1 is an elevational view of an interior of a room in which an array microphone 1 is installed, and FIG. 2 is a plan view of the interior of the room in which the array microphone 1 is installed.

The array microphone 1 is installed on a ceiling 60 in a room. A conference desk T1 is installed directly under the array microphone 1. In the example of FIG. 1 and FIG. 2, a plurality of users (talkers): a user h1, a user h2, a user h3, and a user h4 are present around the conference desk T1. The array microphone 1 has a housing having a thin rectangular parallelepiped shape. In the example of FIG. 1, the top surface of the array microphone 1 is installed on the ceiling 60. It is to be noted that the array microphone 1 may be hung from the ceiling 60, for example. In addition, the array microphone 1 may be configured as a ceiling tile. Moreover, the array microphone 1 may be provided as interior equipment or may be configured to be replaceable. In a case in which the array microphone 1 is installed as a ceiling tile, the ceiling tile is configured to be replaceable. In addition, although the array microphone 1 according to the present preferred embodiment is installed on the ceiling 60, the array microphone 1 does not necessarily need to be installed on the ceiling 60. For example, the array microphone 1 may be installed on a wall surface, a desk top, a floor, or the like.

Figure 3A:
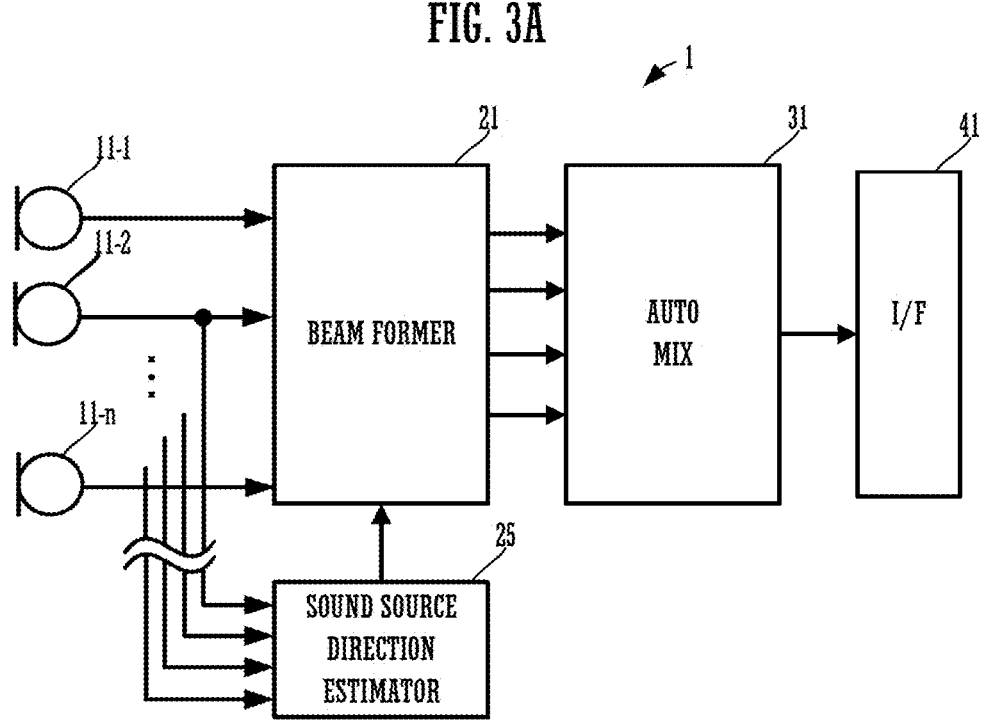
FIG. 3A is a block diagram showing an example of a configuration of the array microphone 1.
Figure 3B:
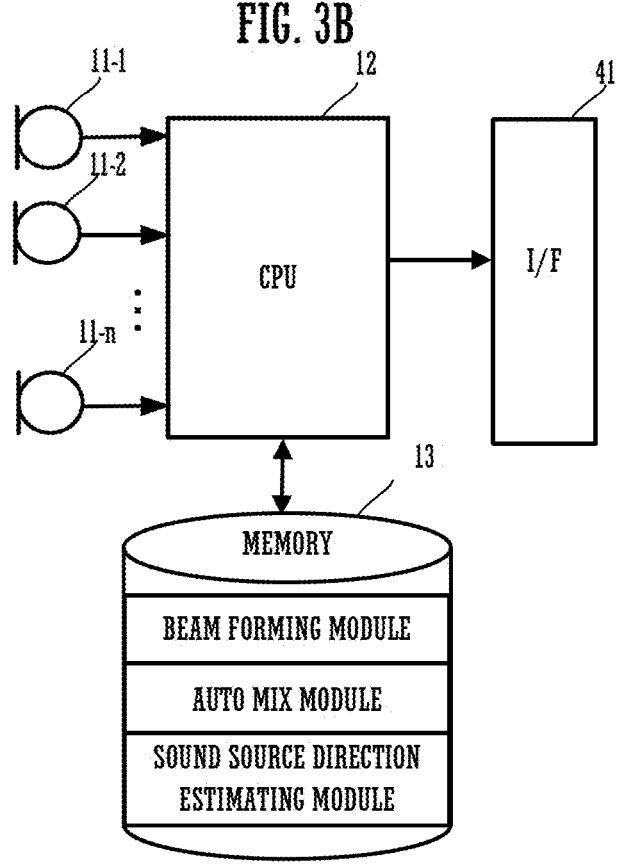
FIG. 3B is a block diagram showing another example of the array microphone 1 of FIG. 3A.

FIG. 3A is a block diagram showing an example of a configuration of the array microphone 1. FIG. 3B is a block diagram showing a configuration of another example of the array microphone 1. The array microphone 1, as shown in FIG. 3A, includes a plurality of microphones 11-1 to 11-$n$, a beam former 21, an auto mixer (AUTOMIX) 31, an interface (I/F) 41, and a sound source direction estimator 25. FIG. 4 is a flow chart showing an operation of the array microphone 1.

Each of the beam former 21, the AUTOMIX 31, and the sound source direction estimator 25 may be configured by hardware or may be configured by software such as the beam forming module, the AUTOMIX module and the sound source direction estimating module, as shown in FIG. 3B. A processor such as a CPU 12 reads and performs software stored in a storage medium such as a memory 13. The CPU 12 performs the same function as the beam former 21 by executing the beamforming module. The CPU 12 performs the same function as the AUTOMIX 31 by executing the AUTOMIX module. The CPU 12 performs the same function as the sound source direction estimator 25 by executing the sound source direction estimating module. It is to be noted that the software does not need to be stored in the memory 13 or the like of the array microphone 1 and may be downloaded each time from another device such as a server and executed. When each of the beam former 21, the AUTOMIX 31, and the sound source direction estimator 25 is configured by software, each of CPU12 and memory 13 may be plural.

The plurality of microphones 11-1 to 11-$n$ are installed on the bottom surface of the housing of the array microphone 1. The sound collection direction of the plurality of microphones 11-1 to 11-$n$ is directed downward of the array microphone 1.

Figure 5:
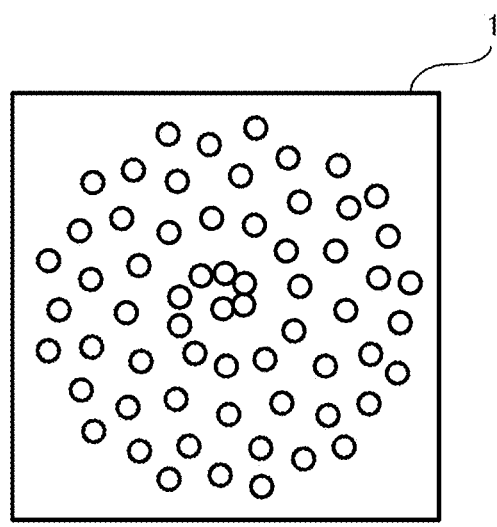
FIG. 5 is a bottom view of the array microphone 1.

FIG. 5 is a view when the array microphone 1 is viewed from the side of the bottom surface. The large number of circles shown in FIG. 5 represent the plurality of microphones 11-1 to 11-$n$. The plurality of microphones 11-1 to 11-$n$, as shown in FIG. 5, configure an array microphone arranged in a plane. However, the arrangement of the plurality of microphones 11-1 to 11-$n$ is not limited to the example shown in FIG. 5. It is to be noted that the plurality of microphones 11-1 to 11-$n$ may be non-directional microphones or may be directional microphones.

As shown in FIG. 3A, an audio signal (hereinafter referred to as a sound collection signal) that has been collected by each of the plurality of microphones 11-1 to 11-$n$ is inputted to the beam former 21. The beam former 21 delays sound collection signals of the plurality of microphones 11-1 to 11-$n$ with a predetermined amount of delay and combines the sound collection signals. As a result, the beam former 21 forms a sound collection beam having strong sensitivity in a predetermined direction. The beam former 21 is able to form a plurality of sound collection beams. In the example of the present preferred embodiment, the beam former 21 forms four sound collection beams (a first sound collection beam b1, a second sound collection beam b2, a third sound collection beam b3, and a fourth sound collection beam b4) at the maximum (see FIG. 2). The number of sound collection beams and the direction of each sound collection beam are determined based on a sound source direction that has been estimated by the sound source direction estimator 25.

The sound collection signals according to the sound collection beams are inputted to the AUTOMIX 31. The AUTOMIX 31 corresponds to the mixing processor of the present invention. The AUTOMIX 31 mixes the sound collection signals according to the sound collection beams by a gain according to the volume of each of the sound collection beams. As a result, the sound collection beam of which the volume is high is emphasized, so that the array microphone 1 is able to clearly obtain the voice of a current talker. However, in the present invention, the AUTOMIX 31 is not an essential configuration.

The audio signal mixed by the AUTOMIX 31 is inputted to the I/F 41. The I/F 41 is a communication I/F such as a USB, for example. The I/F 41 encodes an inputted audio signal into a predetermined data format, and transmits an encoded signal to another device such as a personal computer. As a result, the array microphone 1 is able to transmit the collected sound to a device at a remote place, and is able to achieve a teleconference. It is to be noted that the I/F 41 may receive an audio signal from the device at a remote place. The I/F 41 outputs a received audio signal to a not-shown speaker. As a result, a conference participant can hear a sound of a remote place.

The sound source direction estimator 25 estimates a sound source direction using an audio signal of a plurality of microphones (S11 shown in the flow chart of FIG. 4). The sound source direction estimator 25 estimates a sound source direction by calculating the cross correlation of the sound collection signal of the plurality of microphones, for example. The sound source direction estimator 25, by obtaining the peak of the cross correlation of the sound collection signals of certain two microphones, for example, is able to obtain a direction of a sound source with respect to these two microphones. Furthermore, the sound source direction estimator 25, by obtaining the peak of the cross correlation of the sound collection signals of two different microphones, is able to obtain a direction of a sound source with respect to these two different microphones. The sound source direction estimator 25 estimates a sound source direction based on a plurality of cross correlation peaks calculated in this manner.

Only the estimation of the sound source direction by the two microphones is able to estimate only a one-dimensional direction (a plane direction or an elevation direction, for example). Alternatively, only the estimation of the sound source direction by the two microphones is able to estimate only a one-dimensional direction and a distance to a sound source. However, the sound source direction estimator 25, from the array microphone arranged in a plane, selects two or more sets of a plurality of microphones, and obtains a plurality of cross correlation peaks. As a result, the sound source direction estimator 25 estimates a two-dimensional direction (the plane direction and the elevation direction). Moreover, the sound source direction estimator 25, in addition to the two-dimensional direction, is also able to estimate a distance to a sound source.

In addition, the number of sound sources to be estimated and the estimation accuracy improve as the number of microphones and the number of cross correlations to be calculated increase. The sound source direction estimator 25 according to the present preferred embodiment estimates two sound source directions. In other words, the sound source direction estimator 25 estimates two sound source directions by obtaining two more peaks (two peaks from the high level) of each cross correlation.

It is to be noted that the method of estimating a sound source direction is not limited to the above example. The sound source direction estimator 25 is also able to estimate a sound source direction, for example, by comparing the levels of the sound collection beams in a plurality of directions, the sound collection beams being formed by the beam former 21. In such a case, the beam former 21 forms a sound collection beam in a plurality of directions (1000 directions, for example) in a room in advance. The sound source direction estimator 25 obtains the level of each of the sound collection beams in the plurality of directions. The sound source direction estimator 25 obtains spatial level distribution of the sound collection beams in the plurality of directions. The sound source direction estimator 25 estimates a plurality of directions of a sound source based on the level distribution.

However, as described above, in a case in which a large number (1000 directions, for example) of sound collection beams are formed and spatial level distribution is obtained, the amount of calculation is extremely large. In addition, in a case in which a sound source direction is estimated based on the peak of cross correlation, it is difficult to estimate a large number of sound source directions. Accordingly, the array microphone 1 according to the present preferred embodiment, in order to reduce the amount of calculation, by causing the number of sound collection beams to be greater than the estimation number of sound source directions while reducing the estimation number of sound source directions, supports a large number of sound sources.

Figure 6:
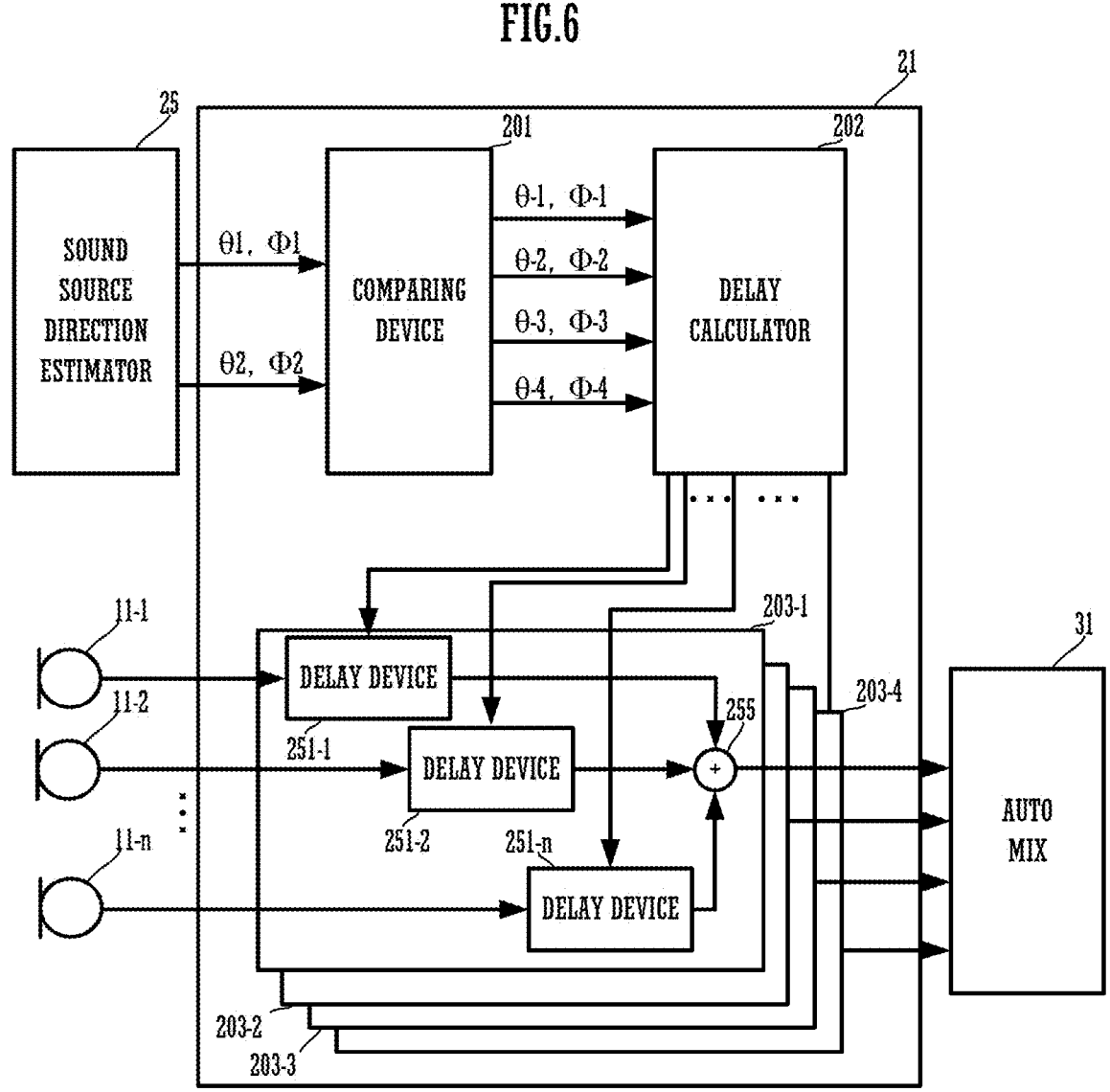
FIG. 6 is a block diagram showing a functional configuration of a beam former 21.

The beam former 21 controls the number and direction of sound collection beams based on the sound source direction that the sound source direction estimator 25 has estimated. FIG. 6 is a block diagram showing a functional configuration of the beam former 21.

The beam former 21 functionally includes a comparing device 201, a delay calculator 202, a delayer 203-1, a delayer 203-2, a delayer 203-3, and a delayer 203-4. The delayer 203-1 includes a delay device 251-1 to a delay device 251-$n$, and an adder 255. The delayer 203-1, the delayer 203-2, the delayer 203-3, and the delayer 203-4 each have the same configuration.

Each functional configuration of the beam former 21 is achieved when hardware such as the CPU 12 or a DSP that configures the beam former 21 reads and executes a program from the memory 13.

The comparing device 201 receives an input of information on the sound source direction that the sound source direction estimator 25 has estimated. In this example, the comparing device 201 receives an input of information that indicates a first sound source direction d1 and an input of information that indicates a second sound source direction d2. The information that indicates the first sound source direction d1 includes an angle $\theta 1$ around a vertical axis that indicates the plane direction and an angle $\Phi 1$ around a horizontal axis that indicates the elevation direction. The information that indicates the second sound source direction d2 includes an angle $\theta 2$ around the vertical axis and an angle $\Phi 2$ around the horizontal axis. The angle around the vertical axis, as shown in FIG. 2, is represented by the relative angle on the basis of a predetermined direction (the right direction in FIG. 2) in a plan view of the housing of the array microphone 1. The angle around the horizontal axis, as shown in FIG. 1, is represented by the relative angle on the basis of a predetermined direction (the right direction in FIG. 1) in an elevation view of the housing of the array microphone 1.

The comparing device 201 determines the number and direction of sound collection beams based on the first sound source direction d1 and the second sound source direction d2 that have been inputted from the sound source direction estimator 25. In the present preferred embodiment, four sound collection beams are formed at the maximum. Accordingly, the comparing device 201 sets the direction of the first sound collection beam b1 to the angle $\theta$-1 and the angle $\Phi$-1, sets the direction of the second sound collection beam b2 to the angle $\theta$-2 and the angle $\Phi$-2, sets the direction of the third sound collection beam b3 to the angle $\theta$-3 and the angle $\Phi$-3, and sets the direction of the fourth sound collection beam b4 to the angle $\theta$-4 and the angle $\Phi$-4.

The comparing device 201 transmits angle information on each set sound collection beam to the delay calculator 202. The delay calculator 202, based on the angle information on each received sound collection beam, calculates the amount of delays of each of the delay device 251-1 to the delay device 251-$n$ in each of the delayer 203-1, the delayer 203-2, the delayer 203-3, and the delayer 203-4. Then, the delay calculator 202 sets the amount of delays of each of the delay device 251-1 to the delay device 251-$n$ in each of the delayer 203-1, the delayer 203-2, the delayer 203-3, and the delayer 203-4. Each of the delay device 251-1 to the delay device 251-$n$ in each of the delayer 203-1, the delayer 203-2, the delayer 203-3, and the delayer 203-4 delays an inputted sound collection signal, and outputs the delayed sound collection signal to the adder 255. The adder 255 forms a sound collection beam by combining these sound collection signals. The sound collection beam that has been formed is outputted to the AUTOMIX 31.

The comparing device 201 stores the angle information on each current sound collection beam in the memory 13. The comparing device 201 compares the angle of the first sound source direction d1 and the second sound source direction d2, and the angle of each current sound collection beam (S12 shown in the flow chart of FIG. 4).

The comparing device 201 determines whether or not a sound collection beam is present within a predetermined angle range with respect to each of the first sound source direction d1 and the second sound source direction d2 (S13). The comparing device 201 determines whether or not a sound collection beam is present within the range of the angle $\theta 1 \pm 5$ degrees and the angle $\Phi 1 \pm 5$ degrees, for example. The comparing device 201, in a case of determining that a sound collection beam is present within the predetermined angle range in both the first sound source direction d1 and the second sound source direction d2, skips the subsequent processing. As a result, the setting of the current sound collection beam is maintained.

The comparing device 201, in a case of determining that a sound collection beam is not present within the predetermined angle range in either the first sound source direction d1 or the second sound source direction d2, determines whether or not the current number of beams reaches the maximum number (S14). In this example, the maximum number of sound collection beams is four. Accordingly, the comparing device 201 determines whether or not four sound collection beams are being currently formed.

The comparing device 201, in a case of determining that three or less sound collection beams are being currently formed, forms a new sound collection beam (S15). The comparing device 201 sets the direction of the new sound collection beam to the first sound source direction d1 or the second sound source direction d2. For example, the comparing device 201, in a case of determining that a sound collection beam is not present within the range of the angle θ1±5 degrees and the angle Φ1±5 degrees when the current number of sound collection beams is three, sets the angle θ-4 and the angle Φ-4 of the fourth sound collection beam b4 to the angle θ1 and the angle Φ1. As a result, the new fourth sound collection beam b4 is directed in the sound source direction.

In addition, the comparing device 201, in a case of determining that four sound collection beams are being currently formed, updates the angle of the earliest updated sound collection beam (S16).

Figure 7:
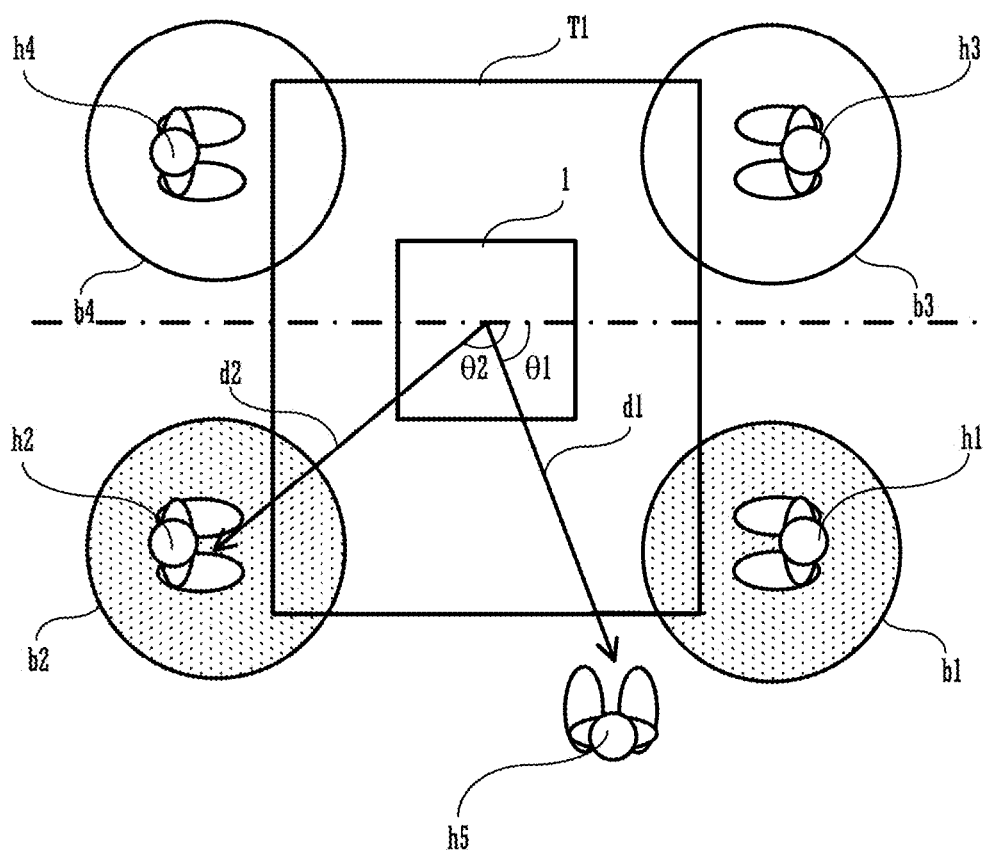
FIG. 7 is a plan view of the interior of a room in which the array microphone 1 is installed.
Figure 8:
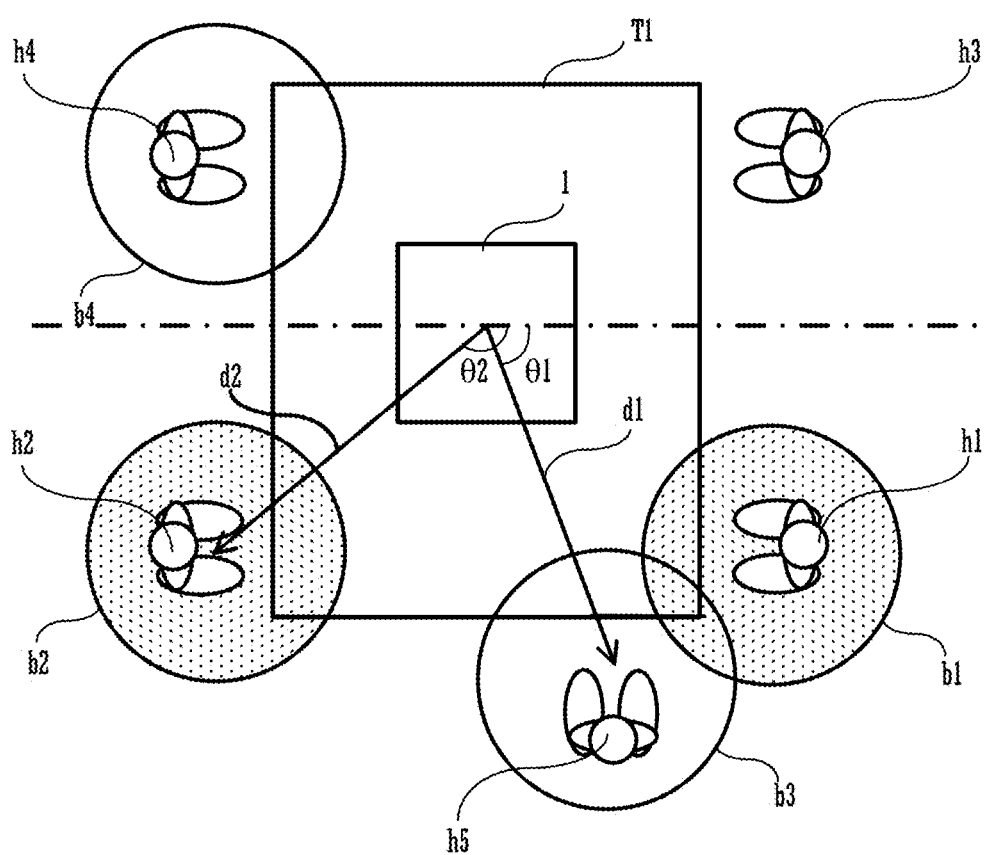
FIG. 8 is a plan view of the interior of a room in which the array microphone 1 is installed.

The plan views of FIG. 7 and FIG. 8 are views illustrating a case in which the talker h1 ends an utterance and the talker h2 and a new talker h5 issue an utterance, as an example.

The sound source direction estimator 25 estimates the first sound source direction d1 in a direction of the talker h5. In addition, the sound source direction estimator 25 estimates the second sound source direction d2 in a direction of the talker h2. In such a case, the comparing device 201 determines that a sound collection beam is not present within the predetermined angle (within the range of the angle θ1±5 degrees and the angle Φ1±5 degrees, for example) of the first sound source direction d1. Then, as shown in the plan view of FIG. 8, the comparing device 201, in a case in which the earliest updated sound collection beam is the third sound collection beam, for example, sets the angle θ-3 and the angle Φ-3 of the third sound collection beam b3 to the angle θ1 and the angle Φ1. As a result, the third sound collection beam b3 is directed in the direction of the talker h5.

Even when the talker h5 ends the utterance and the talker h1 resumes an utterance, the first sound collection beam b1 is directed in the direction of the talker h1, so that the array microphone 1 is able to collect sound without lacking the beginning of the utterance of the talker h1.

In this manner, the array microphone 1 causes the number of sound collection beams to be greater than the estimation number of sound source directions, and directs the sound collection beams in a direction in addition to the currently estimated sound source direction. Accordingly, the array microphone 1, even when a talker is changed, is able to collect an utterance of a new talker by the sound collection beam that has been already directed in another direction. Therefore, the array microphone 1 is able to collect the beginning of an utterance of a new talker while reducing the amount of calculation.

It is to be noted that a sound collection beam to be updated is not limited to the earliest updated sound collection beam.

For example, the comparing device 201 may update a sound collection beam of which the angle is closest to the estimated sound source direction.

Figure 9:
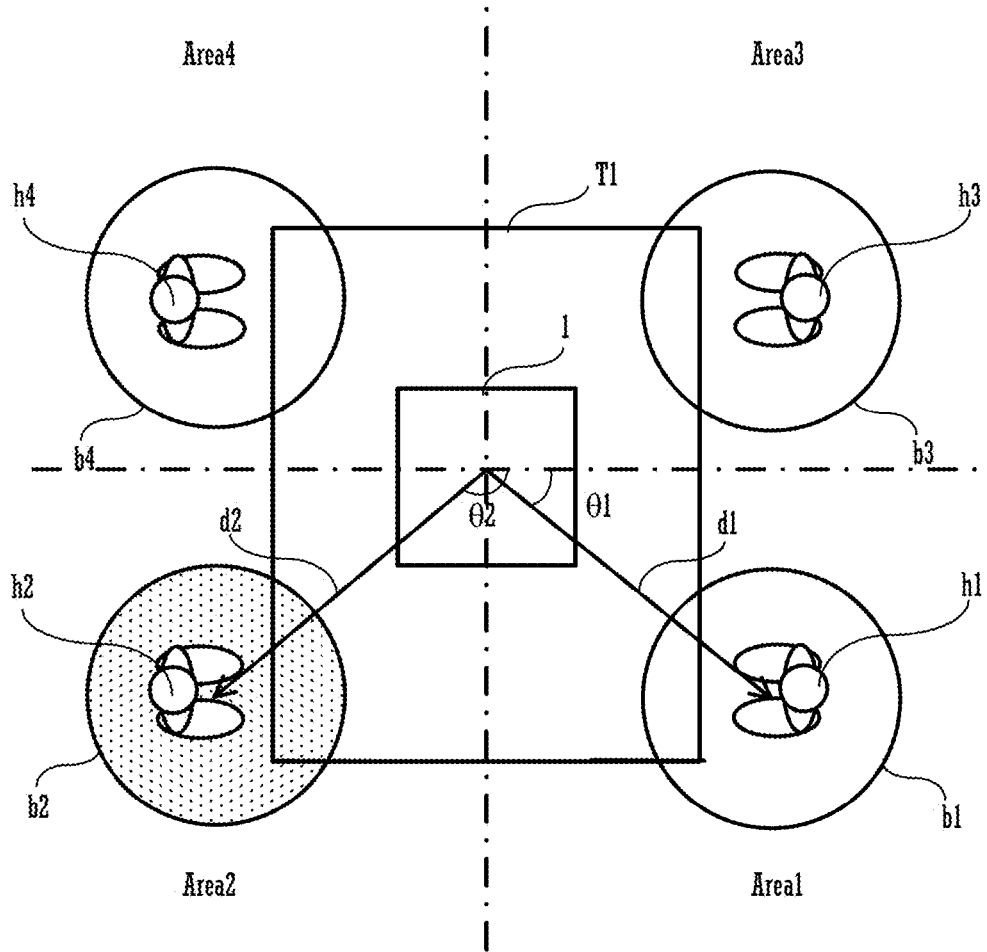
FIG. 9 is a plan view of the interior of a room in which the array microphone 1 is installed.

In addition, the comparing device 201 may assign an area to each sound collection beam. For example, as shown in FIG. 9, the comparing device 201, in a plan view of the interior of the room, sets four areas. Then, the comparing device 201 sets an area (Area 1) assigned to the first sound collection beam, an area (Area 2) assigned to the second sound collection beam, an area (Area 3) assigned to the third sound collection beam, and an area (Area 4) assigned to the fourth sound collection beam. The comparing device 201 determines an area to which the estimated sound source direction belongs, and updates the angle of a corresponding sound collection beam.

Alternatively, the comparing device 201 may record the estimated frequency of the sound source direction for each area, and may determine the sound collection beam to be updated according to the estimated frequency. For example, in a case in which the estimated frequency in the sound source direction is high in the Area 1, and the estimated frequency in the sound source direction is low in the Area 3, the comparing device 201 may set the angle of the third sound collection beam assigned to the Area 3 to direct in the direction of the Area 1.

In addition, the sound collection direction of at least one sound collection beam among the plurality of sound collection beams may be fixed. A user may manually set and fix the direction of the sound collection beam. For example, in a case in which it is known in advance that a talker such as a chairperson with a high utterance frequency is present, the user sets the direction of a sound collection beam to the direction of the chairperson. As a result, the array microphone 1 is able to appropriately collect the beginning of an utterance while further reducing the amount of calculation.

Figure 10:
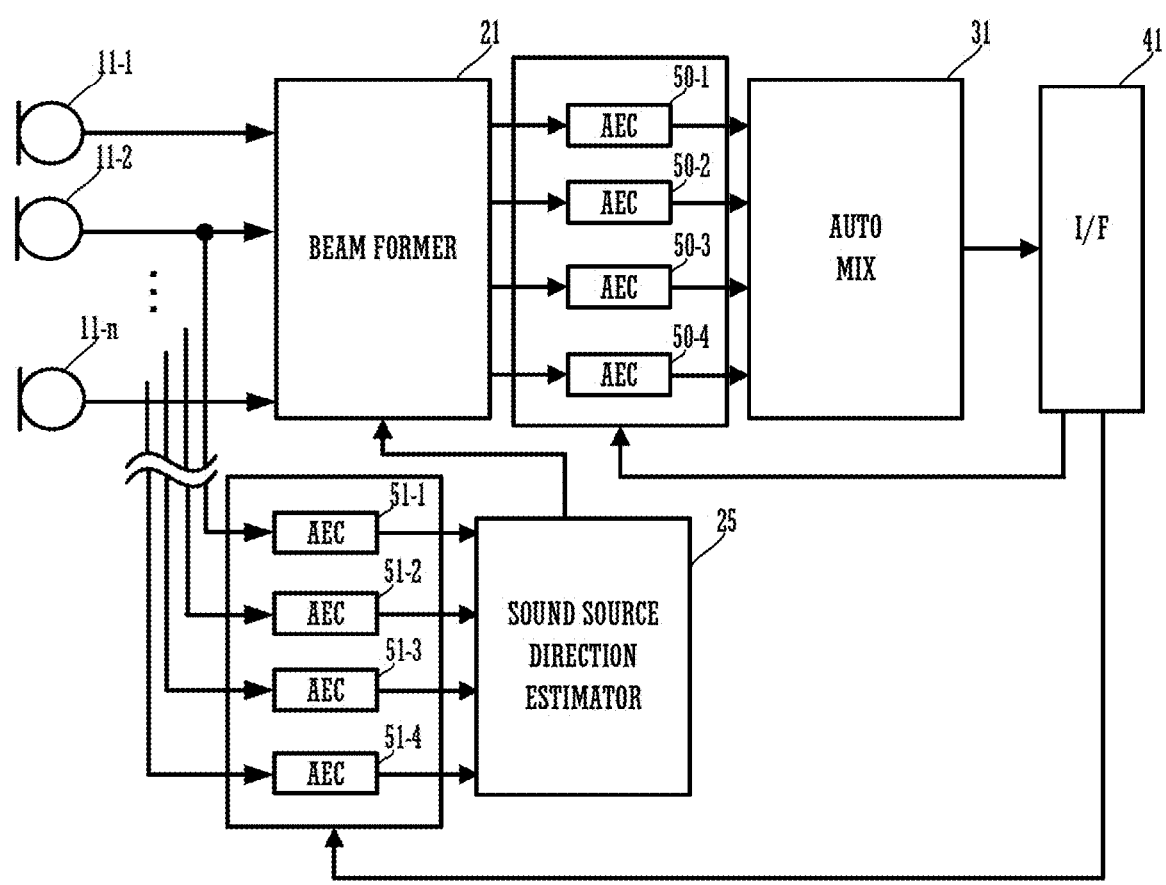
FIG. 10 is a block diagram showing a configuration of an array microphone 1A.

Subsequently, FIG. 10 is a block diagram showing a configuration of an array microphone 1A further including an echo canceller. The same reference numerals are used to refer to components common to the array microphone 1 shown in FIG. 3A, and the description will be omitted. The array microphone 1A of FIG. 10 includes a beam former 21, an AEC (an echo canceller) 50-1, an AEC 50-2, an AEC 50-3, and an AEC 50-4 that are connected to the AUTOMIX 31. In addition, the array microphone 1A includes an AEC 51-1, an AEC 51-2, an AEC 51-3, and an AEC 51-4 each of which is connected to the sound source direction estimator 25 and either of a plurality of microphones. The I/F 41 receives an audio signal from a device at a remote place. The I/F 41 outputs a received audio signal to the AEC 51-1, the AEC 51-2, the AEC 51-3, and the AEC 51-4. In addition, the I/F 41 outputs the received audio signal to the AEC 50-1, the AEC 50-2, the AEC 50-3, and the AEC 50-4.

Each of the AEC 51-1, the AEC 51-2, the AEC 51-3, and the AEC 51-4 receives an input of a sound collection signal of a corresponding microphone, and performs processing to reduce an echo component. Specifically, each of the AEC 51-1, the AEC 51-2, the AEC 51-3, and the AEC 51-4 includes a digital filter. The AEC 51-1, the AEC 51-2, the AEC 51-3, and the AEC 51-4 have a filter coefficient that simulates a transfer function from a speaker to a microphone. The AEC 51-1, the AEC 51-2, the AEC 51-3, and the AEC 51-4, by performing filter processing an audio signal received from the device at a remote place, generate a pseudo echo signal that simulates an echo component. The AEC 51-1, the AEC 51-2, the AEC 51-3, and the AEC 51-4 reduce the pseudo echo signal from the sound collection signal of the microphone. As a result, the sound source direction estimator 25 is able to estimate a sound source direction by the sound collection signal of which the echo component has been reduced.

The AEC 50-1, the AEC 50-2, the AEC 50-3, and the AEC 50-4 respectively receive an input of a sound collection signal according to the first sound collection beam b1, the second sound collection beam b2, the third sound collection beam b3, and the fourth sound collection beam b4, and perform processing to reduce an echo component. The processing to reduce an echo component is the same as the processing of the AEC 51-1, the AEC 51-2, the AEC 51-3, and the AEC 51-4. In this manner, the array microphone 1A is able to reduce the amount of calculation more by reducing an echo component from the sound collection signal according to the sound collection beam than by reducing an echo component from the sound collection signals of all the microphones.

Finally, the foregoing preferred embodiments are illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. A microphone array microphone comprising:
   a plurality of microphones;
   an estimator that estimates at least one sound source direction;
   a beam former that forms a plurality of sound collection beams larger in number than the number of the estimated at least one sound source direction but no more than a predetermined maximum number, using sound collection signals from the plurality of microphones;
   a memory storing information indicating a beam direction of each of the plurality of sound collection beams; and
   a comparator that compares the estimated at least one sound source direction with the stored beam directions, wherein the comparator:
   when the estimated at least one sound source direction corresponds to at least one of the stored beam directions, maintains the plurality of sound collection beams; and
   when the estimated at least one sound source direction does not correspond to any of the stored beam directions:
      causes the beam former to form at least one new sound collection beam corresponding to the estimated at least one sound source direction; and
      when the number of the plurality of sound collection beams reaches the predetermined maximum number, updates at least one of the stored beam directions to the estimated at least one sound source direction.

2. The array microphone array according to claim 1, further comprising a mixing processor that mixes an audio signal corresponding to one sound collection beam, among the plurality of sound collection beams, by a gain according to volume of the one sound collection beam.

3. The microphone array according to claim 1, wherein the plurality of microphones are arranged in a plane.

4. The microphone array according to claim 1, wherein the plurality of microphones are configured as a ceiling tile.

5. The microphone array according to claim 4, wherein the ceiling tile is configured to be replaceable.

6. The microphone array according to claim 1, further comprising an echo canceller that removes an echo component from an audio signal corresponding to one sound collection beam, among the plurality of sound collection beams.

7. The microphone array according to claim 1, further comprising:
   an echo canceller that removes an echo component from each of the plurality of sound collection signals from the plurality of microphones,
   wherein the estimator estimates each of the at least one sound source direction, using the sound collection signals in which the echo components have been removed by the echo canceller.

8. The microphone array according to claim 1, wherein:
   a first sound collection direction of at least one sound collection beam, among the plurality of sound collection beams, is fixed, and
   a second sound collection direction of at least another sound collection beam, among the plurality of sound collection beams, is determined based on the estimated at least one sound source direction.

9. The microphone array according to claim 1, wherein the beam former forms one sound collection beam, among the plurality of sound collection beams, for each predetermined area.

10. The microphone array according to claim 9, wherein the beam former:
    records an estimated frequency number of the estimated at least one sound source direction for the each predetermined area; and
    forms the one sound collection beam according to the estimated frequency number.

11. A sound collection method executable by a processor, the method comprising:
    estimating at least one sound source direction;
    forming a plurality of sound collection beams larger in number than the number of the estimated at least one sound source direction but no more than a predetermined maximum number, using sound collection signals from a plurality of microphones;
    storing, in a memory, information indicating a beam direction of each of the plurality of sound collection beams;
    comparing the estimated at least one sound source direction with the stored beam directions;
    when the estimated at least one sound source direction corresponds to at least one of the stored beam directions, maintains the plurality of sound collection beams; and
    when the estimated at least one sound source direction does not correspond to any of the stored beam directions:
       forming at least one new sound collection beam corresponding to the estimated at least one sound source direction; and
       when the number of the plurality of sound collection beams reaches the predetermined maximum number, updating at least one of the stored beam directions to the estimated at least one sound source direction.

12. The sound collection method according to claim 11, further comprising mixing an audio signal corresponding to one sound collection beam, among the plurality of sound collection beams, by a gain according to volume of the one sound collection beam.

13. The sound collection method according to claim 11, wherein the plurality of microphones are configured as a ceiling tile.

14. The sound collection method according to claim 13, wherein the ceiling tile is configured to be replaceable.

15. The sound collection method according to claim 11, further comprising removing an echo component from an audio signal corresponding to one sound collection beam, among the plurality of sound collection beams.

16. The sound collection method according to claim 15, further comprising:
   removing an echo component from each of the plurality of sound collection signals from the plurality of microphones,
   wherein the estimating of the plurality of sound source directions estimates each of the at least one sound source direction, using the sound collection signals in which the echo components have been removed.

17. The sound collection method according to claim 11, wherein:
   a first sound collection direction of at least one sound collection beam, among the plurality of sound collection beams, is fixed, and
   a second sound collection direction of at least another sound collection beam, among the plurality of sound collection beams, is determined based on the estimated at least one sound source direction.

18. The sound collection method according to claim 11, wherein the forming of the plurality of sound collection beams forms one sound collection beam, among the plurality of the sound collection beams, for each predetermined area.

19. The sound collection method according to claim 18, wherein the forming of the plurality of sound collection beams:
   records an estimated frequency number of the estimated at least one sound source direction for the each predetermined area; and
   forms the one sound collection beam according to the estimated frequency number.

20. A microphone array comprising:
   a plurality of microphones;
   at least one memory storing instructions; and
   at least one processor that implements the instructions to:
      estimate at least one sound source direction;
      form a plurality of sound collection beams larger in number than the number of the estimated at least one sound source direction but no more than a predetermined maximum number, using sound collection signals from the plurality of microphones;
      store, in the at least one memory, information indicating a beam direction of each of the plurality of sound collection beams;
      compare the estimated at least one sound source direction with the stored beam directions;
      when the estimated at least one sound source direction corresponds to at least one of the stored beam directions, maintains the plurality of sound collection beams; and
      when the estimated at least one sound source direction does not correspond to any of the stored beam directions:
         form at least one new sound collection beam corresponding to the estimated at least one sound source direction; and
         when the number of the plurality of sound collection beams reaches the predetermined maximum number, update at least one of the stored beam directions to the estimated at least one sound source direction.

* * * * *